United States Patent [19]
Watanabe et al.

[11] Patent Number: 5,300,868
[45] Date of Patent: Apr. 5, 1994

[54] ROBOT TEACHING METHOD

[75] Inventors: Atsushi Watanabe; Tatsuo Karakama; Taro Arimatsu; Kazuhiko Akiyama, all of Yamanashi, Japan

[73] Assignee: Fanuc Ltd., Minamitsuru, Japan

[21] Appl. No.: 923,802

[22] PCT Filed: Jan. 23, 1992

[86] PCT No.: PCT/JP92/00065
§ 371 Date: Sep. 2, 1992
§ 102(e) Date: Sep. 2, 1992

[87] PCT Pub. No.: WO92/12830
PCT Pub. Date: Aug. 6, 1992

[30] Foreign Application Priority Data
Jan. 28, 1991 [JP] Japan .................. 3-26820

[51] Int. Cl.$^5$ ............................... B25J 9/22
[52] U.S. Cl. .................. 318/568.13; 318/568.24; 901/3
[58] Field of Search ........... 318/568.13, 568.14, 318/568.23, 568.24; 901/3, 15; 364/513, 170, 571, 478, 516

[56] References Cited

U.S. PATENT DOCUMENTS

| | | | |
|---|---|---|---|
| 4,639,878 | 1/1987 | Day et al. ........................ | 364/513 |
| 4,670,849 | 6/1987 | Okada et al. .................... | 364/513 |
| 4,761,745 | 8/1988 | Kodaira .......................... | 318/568.13 |
| 4,954,762 | 9/1990 | Miyake et al. .................. | 318/568.13 |
| 4,972,347 | 11/1990 | Tarvin et al. .................. | 318/568.13 |

FOREIGN PATENT DOCUMENTS 0201403 10/1985 Japan .
0201404 10/1985 Japan .

Primary Examiner—William M. Shoop, Jr.
Assistant Examiner—John W. Cabeca
Attorney, Agent, or Firm—Staas & Halsey

[57] ABSTRACT

A operation program of a robot is simply changed by using a workpiece body without using a master body. The operation program of the robot is corrected by correction data obtained from cameras. When a point of the operation program is desired to be changed to another point, a point on the workpiece body is changed to a changed point. A robot control unit reads the changed point as the coordinate values of the respective axes and changes the same to space coordinate values. Further, the space coordinate values are converted to reference space coordinate values on the master body by an inverse conversion matrix of the correction data. The reference space coordinate values are inversely converted to the coordinate values of respective reference axes. Since the operation program is commanded by the coordinate values of the respective reference axes, the point of the operation program is converted to the another point by using the coordinate values of the respective reference axes. With this method, the operation program can be simply changed without using the master body.

3 Claims, 3 Drawing Sheets

ROBOT TEACHING METHOD

BACKGROUND OF THE INVENTION

1. Field of the Invention

The present invention relates to a robot teaching method for changing an operation program for a robot, and more specifically, to a method of teaching a robot by which the teaching points of an operation program can be simply changed.

2. Description of the Related Art

Robots have been widely used in welding lines and assembly lines for automobiles. In these manufacturing lines for automobiles, even if an operation program for a robot is created, each automobile is not always stopped at a given position. To cope with this problem, a position of an object is confirmed by using a visual sensor or the like and the operation program is corrected, based on data obtained therefrom, so that each object can be accurately processed.

More specifically, positions of the operation program for the robot are taught by using a master body. Next, a visual sensor recognizes the position of the master body and stores it as a reference position. Next, an actual workpiece body is placed in position, the visual sensor recognizes the position of the workpiece body, notifies a robot control unit of an amount of dislocation between the master body and the workpiece body as correction data, and the robot control unit adds the correction data to the operation program in order to correctly process the workpiece body.

Nevertheless, a problem arises in that when teaching positions and the like of an operation program are changed, a master body must again be placed in position to change the operation program. This job of placing the master body is time consuming. Further, the master body must be kept in the vicinity of a manufacturing line at all times.

Conversely, since the tool center point (TCP) of the robot moves on a locus corrected by the correction data on the workpiece body, it is actually difficult to change the operation program by using only the workpiece body.

SUMMARY OF THE INVENTION

Taking the above into consideration, an object of the present invention is to provide a robot teaching method by which an operation program can be simply changed by using a workpiece body.

To attain the above object, according to the present invention, there is provided a robot teaching method for changing an operation program for a robot which comprises the steps of positioning the tool center point (TCP) of the robot to a point to be changed on a workpiece body, determining first coordinate values of the point to be changed, converting the first coordinate values to second coordinate values on a master body by the correction data and rewriting a command value of the operation program to the second coordinate values, thereby changing the operation program.

The TCP is positioned to the changed point on the workpiece body and the first coordinate values of the changed point are determined. The first coordinate values are changed to the second coordinate values on the master body by the correction data. The operation program can be changed without using the master body by rewriting the command value of the operation program to the second coordinate values. Of course, this conversion is executed by the control program of a robot control unit.

DESCRIPTION OF THE PREFERRED EMBODIMENT

An embodiment of the present invention will be described below with reference to the drawings.

Figure 2:
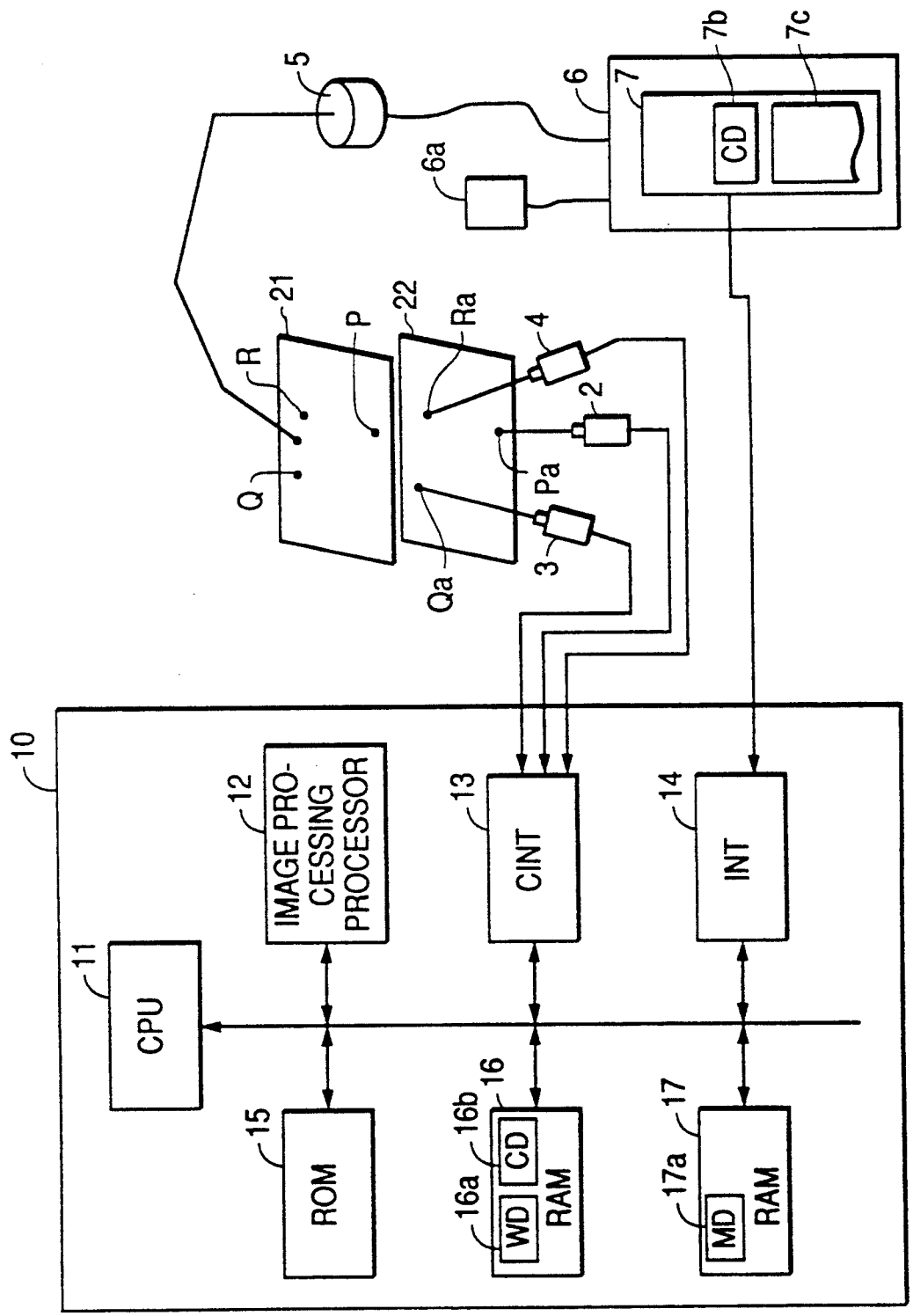
FIG. 2 is a diagram showing an arrangement of a robot system embodying a robot teaching method according to the present invention.

FIG. 2 is a diagram showing an arrangement of a robot system embodying a robot teaching method according to the present invention. This system a master body 21, workpiece body 22, cameras 2, 3 and 4, robot 5, robot control unit 6, and visual sensor unit 10. The master body 21 has reference points P, Q and R. Further, the workpiece body 22 has points Pa, Qa and Ra corresponding to the points on the master body 21. FIG. 2 exaggeratedly represents an amount of dislocation between the master body 21 and the workpiece body 22. Gage holes disposed on the lower portion of an automobile body are used as the respective points of the master body 21 and workpiece body 22.

First, the master body 21 is placed in position. The points P, Q and R are photographed by the cameras 2, 3 and 4. The photographed data is supplied to the visual sensor unit 10, converted to the coordinate value data (MD) 17a of the points P, Q and R by an image processing processor 12 and stored in a RAM 17. Next, the master body 21 is removed and the actual workpiece body 22 is placed at a position where it is processed and the points Pa, Qa and Ra corresponding to the points P, Q and R are photographed by the cameras 2, 3 and 4. The photographed data is supplied to the visual sensor unit 10.

The visual sensor unit 10 include a processor 11 and is controlled by a control program stored in a ROM 15. Further, the processor 11 is interconnected with the image processing processor 12, a camera interface 13, interface 14 with the robot control unit 6, and RAMs 16, 17 through a bus. The photographed data from the cameras 2, 3 and 4 is temporarily stored in the RAM 16 through the camera interface (CINT) 13. This photographed data is converted to the coordinate value data (WD) 16a of the points Pa, Qa and Ra by the image processing processor 12 and stored in the RAM 16. The coordinate value data 16a is compared with the coordinate value data 17a of the points P, Q and R of the master body 21 to determine correction data (CD) 16b. The correction data 16b is supplied to the memory 7 of the robot control unit 6 through the interface 14 and stored therein as correction data 7b. The correction data 7b is created as a conversion matrix for converting points on the master body 21 to points on the workpiece body 22.

On the other hand, an operation program 7c of the robot 5 is first created based on the master body 21. In the actual operation of the robot 5, the workpiece body 22 is photographed by the cameras 2, 3 and 4, and the correction data 16b is created by the visual sensor unit 10, supplied to the memory 7 of the robot control unit 6 and stored therein as the correction data 7b. The robot control unit 6 converts points of the operation program 7c to points on the workpiece body 22 based on the correction data 7b, i.e., the conversion matrix for enabling the robot 5 to carry out a job. With this arrangement, the robot 5 can correctly carry out the job even if a position on the workpiece body 22 is dislocated from a point on the master body 21.

Figure 1:
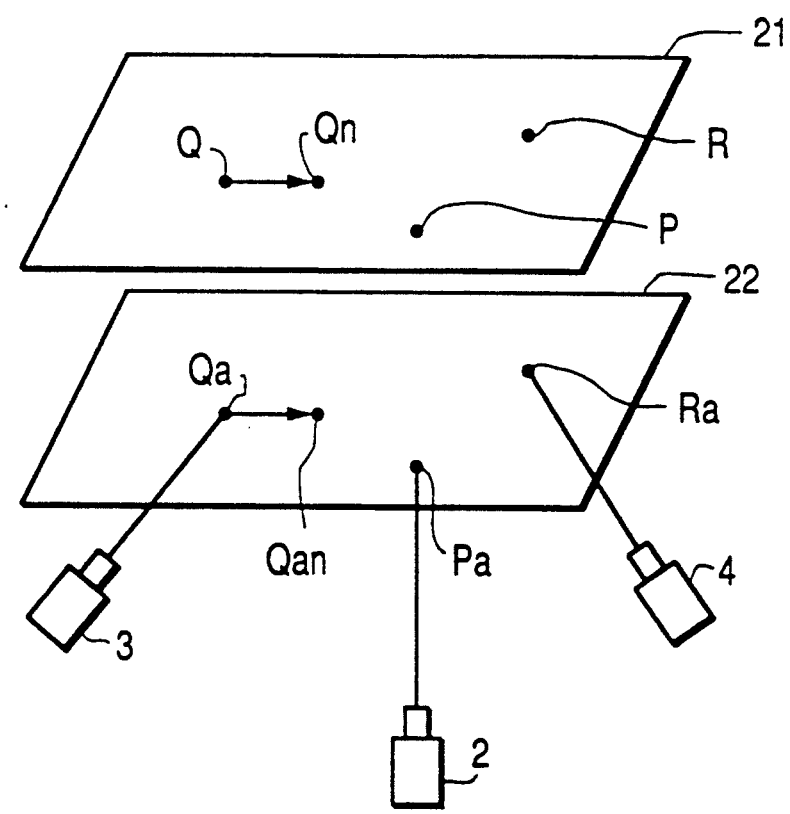
FIG. 1 is a diagram showing the relationship between a master body and a workpiece body.

Next, a case in which the operation program 7c is partially changed will be described. FIG. 1 is a diagram showing the relationship between the master body and the workpiece body. Although the points P, Q and R are described in FIG. 2 as points for determining the correction data 7b, points for determining the correction data 7b are actually different from points of the operation program. For the sake of explanation, however, these points P, Q and R are described as the points of the operation program. For example, the point Q of the operation program 7c is assumed to be changed to a point Qn. If the master body 21 is present at all times, this change can be effected at once, but actually the master body 21 is stored in another place or may not be available. Therefore, the change of the operation program 7c is carried out by using the workpiece body 22. For this purpose, a teaching operation panel 6a is operated to move the tool center point (TCP) of the robot 5 from the point Qa to a point Qan to cause the robot control unit 6 to recognize the point Qan to change the operation program 7c.

Figure 3:
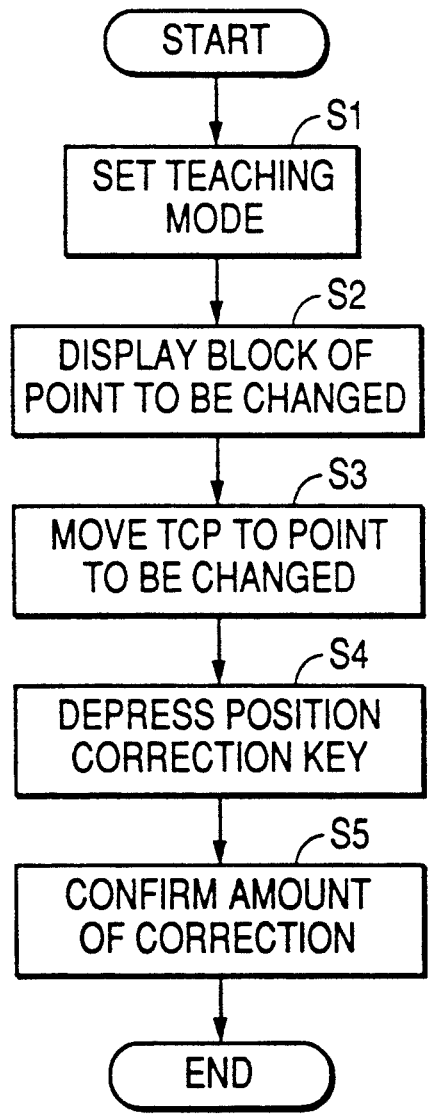
FIG. 3 is a flowchart showing an operation effected by an operator for changing an operation program.

Next, the change of the operation program now will be described in detail. FIG. 3 is a flowchart showing an operation effected by an operator for changing the operation program 7c, wherein numerals prefixed with an "S" indicate the numbers of the steps of the process.

In step S1, a teaching mode is set by operating the teaching operation panel 6a;

In step S2, the operation program is displayed at a not shown display unit on the teaching operation panel 6a to display a block to be changed, in which this block is a command block for moving the point Q;

In step S3, the TCP of the robot 5 is moved from the point Qa before the change to the point Qan after the change by using the teaching operation panel 6a;

In step S4, a not shown position correction key on the teaching operation panel 6a is depressed, and when this key is depressed, the robot control unit reads the point Qa before the change and the point Qan after the change, further changes the point Q of the operation program 7c to the point Qn by using the correction data 7b and displays a block after the change at the display unit of the teaching operation panel 6a, and the above process will be described below in detail; and In step 5 an operator confirms the content of the block after the change and finishes the operation for changing the operation program.

As described above, the operator can simply change the operation program 7c by using only the workpiece body 21 without using the master body 22.

Figure 4:
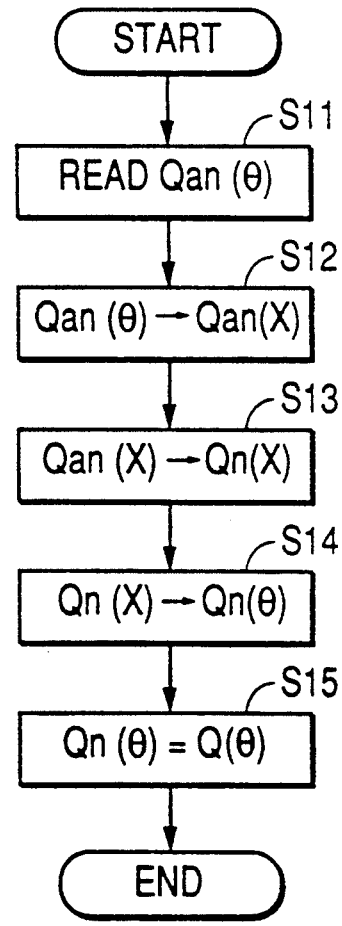
FIG. 4 is a flowchart of a process effected by a robot control unit for changing the operation program.

Next, a processing operation for changing the operation program in the robot control unit will be described. FIG. 4 is a flowchart of a process effected by the robot control unit 6 for changing the operation program, wherein numerals prefixed with an "S" indicate the numbers of the steps of the process.

In step S11, when an operator depresses a correction key at step S4 of FIG. 3, the robot control unit 6 reads the coordinate values for respective axes, i.e. coordinate values Qan ($\theta$) for the respective axes in robot control unit 6, wherein the coordinate values for the respective axes are the coordinate values of the respective arms of the robot 5 and generally represented by axis names such as $\theta$, W, U, $\gamma$, $\beta$, $\alpha$, and the like, and these coordinate values of the respective axes are represented by the coordinate values Qan ($\theta$) for the respective axes as a whole;

In step S12 next, the coordinate values Qan ($\theta$) for the respective axes are converted to space coordinate values Qan (X) on the workpiece body 22, which represent the coordinate values X, Y, Z on the space of the TCP of the robot 5 and the attitude of the robot 5, and these values are represented by the space coordinate values Qan (X);

In step S13, the space coordinate values Qan (X) are converted to space coordinate values Qn (X) on the master body 21, and this conversion is effected by converting the space coordinate values Qan (X) by the inverse conversion matrix of the correction data 7b;

In step S14, the space coordinate values Qn (X) are converted to the coordinate values Qn ($\theta$) of the respective axes on the master body 21, wherein the coordinate values Qn ($\theta$) of the respective axes correspond to the coordinate values of the respective axes on the master body 21, i.e. to the command values of the operation program 7c; and In step S15, the coordinate values Qn ($\theta$) of the respective axes are replaced with the command values Q ($\theta$) for the changed block of the operation program 7c.

In the aforesaid manner, the operation program can be changed by using only the workpiece body 22 without using the master body 21.

Although the change of points of the operation program is described in the above explanation, the addition of new points, deletion of unnecessary points and the like can be carried out in the same way in addition to the above change.

As described above, according to the present invention, since the operation program can be changed by using only the workpiece body, the operation program can be simply changed without the need for reserving the master body or placing the same in position again.

We claim:

1. A robot teaching method for changing an operation program for a robot, comprising the steps of:
   a.) positioning the tool center point (TCP) of said robot to a point to be changed on a workpiece body;
   b.) determining first coordinate values of said point to be changed;
   c.) converting said first coordinate values to second coordinate values on a master body based on the correction data; and
   d.) rewriting a command value of said operation program to said second coordinate values thereby changing said operation program.

2. A robot teaching method according to claim 1, wherein said operation program is commanded by the coordinate values of respective axes of arms of said robot.

3. A robot teaching method according to claim 2, wherein step c.) includes the sub-steps of:
   converting the first coordinate values of the respective axes on said workpiece body of said point to be changed to space coordinate values,
   converting said space coordinate values to reference space coordinate values on said master body based on said correction data, and
   converting said reference space coordinate values to said second coordinate values of the respective axes on said master body.

* * * * *